Feb. 17, 1953 D. D. ROBERTSON ET AL 2,629,021
COORDINATE SWITCHING AND LOCK-OUT CIRCUIT
IN INTERPOLATED SPEECH RECEIVING SYSTEM
Filed Dec. 19, 1950 3 Sheets-Sheet 1

INVENTORS: D. D. ROBERTSON
A. V. WURMSER
BY H. A. Burgess
ATTORNEY

INVENTORS: D. D. ROBERTSON
A. V. WURMSER
BY H. A. Burgess
ATTORNEY

Feb. 17, 1953 D. D. ROBERTSON ET AL 2,629,021

COORDINATE SWITCHING AND LOCK-OUT CIRCUIT IN INTERPOLATED SPEECH RECEIVING SYSTEM

Filed Dec. 19, 1950 3 Sheets-Sheet 3

INVENTORS: D. D. ROBERTSON
A. V. WURMSER

BY H. A. Burgess

ATTORNEY

Patented Feb. 17, 1953 2,629,021

UNITED STATES PATENT OFFICE 2,629,021

COORDINATE SWITCHING AND LOCK-OUT CIRCUIT IN INTERPOLATED SPEECH RECEIVING SYSTEM

Donald D. Robertson, Morristown, and Alphons V. Wurmser, Mount Bethel, N. J., assignors to Bell Telephone Laboratories, Incorporated, New York, N. Y., a corporation of New York Application December 19, 1950, Serial No. 201,631

5 Claims. (Cl. 179—18)

The present invention relates to interpolated speech transmission in which speech is transmitted in short fragments over available toll circuits with fragments from different talkers intermingled on the same circuits to make maximum use of the circuits by minimizing periods of no transmission during pauses between words or syllables of any one talker.

A system of this general type is disclosed in a copending application of A. C. Dickieson, E. G. Edwards, D. D. Robertson and A. V. Wurmser Case 27—42—9—6, Serial No. 201,586, filed December 19, 1950, to which reference may be made for an understanding of the system as a whole.

The present invention is concerned with the receiving portion of such a system and particularly with the problem of insuring that each speech fragment as received over one of the transmission circuits is routed into the intended subscriber line.

It is an object of this invention therefore to provide for the interconnection between any receiving trunk or channel circuit and any desired one of a group of subscriber lines in a speech interpolation system, each such interconnection lasting only for the duration of the speech spurt that is being received.

In accordance with this invention in the particular form of embodiment to be described herein, a lattice or matrix is used comprising channel or trunk circuits crossing circuits which are identified with particular subscriber lines in a coordinate array. An ionization tube is provided at each cross-over point of the lattice and is controlled jointly by a channel-identifying signal and a subscriber-identifying signal. When both of these are present, the corresponding tube ionizes and in ionizing, prevents all of the other tubes associated with the same channel and with the same line from ionizing. The operated tube remains energized only while the speech fragment is being received and as long as the tube is energized it holds the channel and line busy to other incoming calls.

Figures 1, 4:
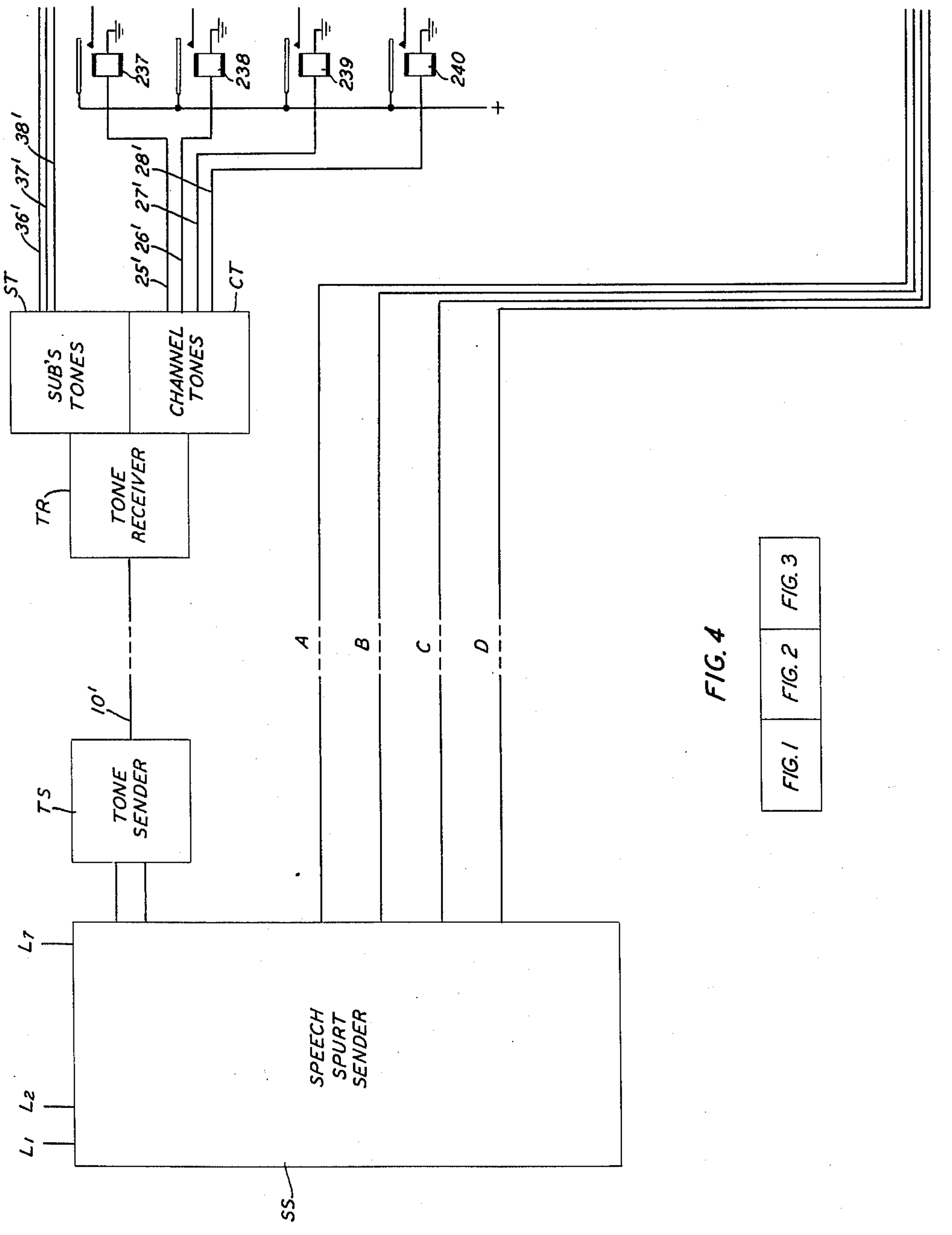
Figure 2:
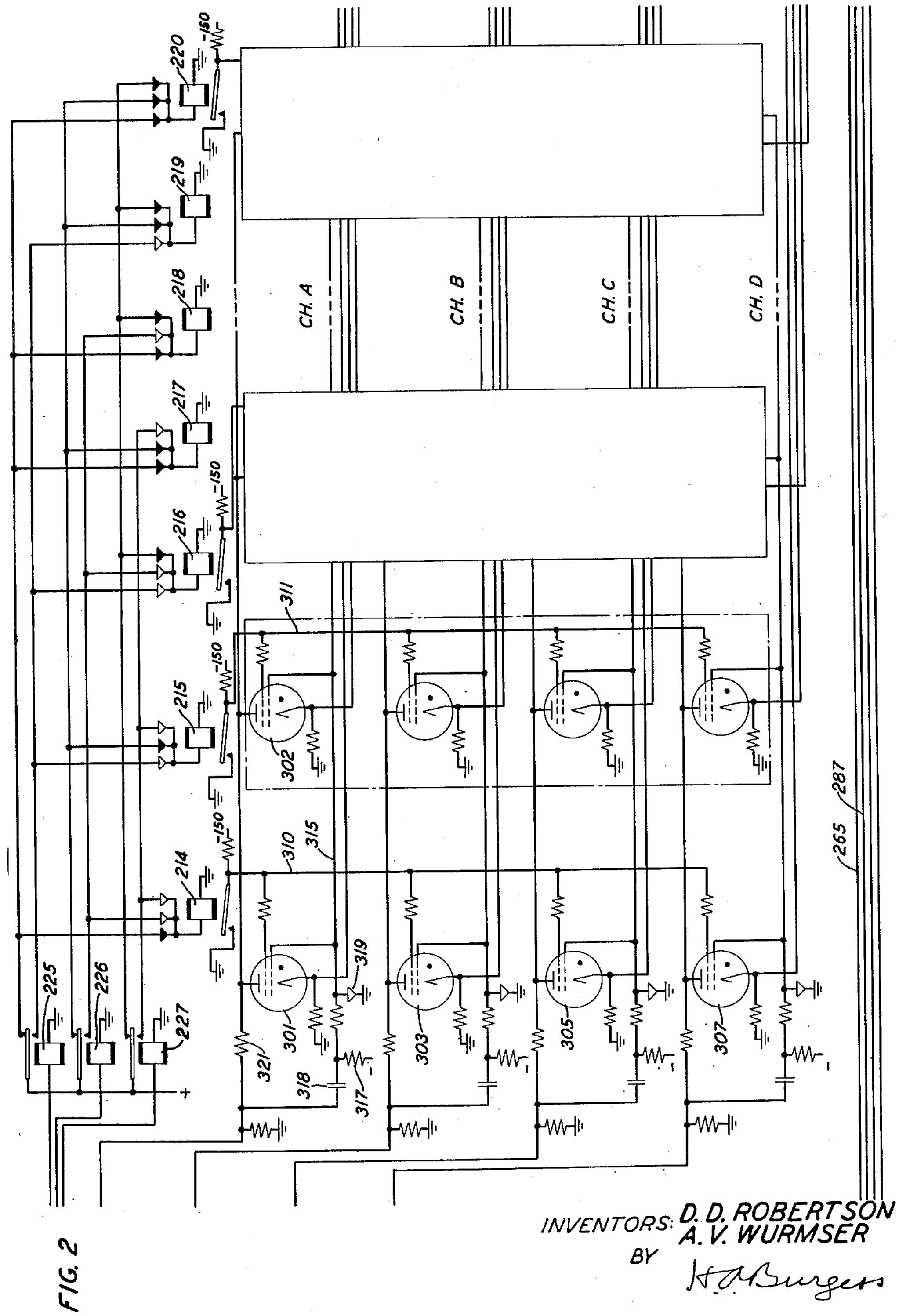
Figure 3:
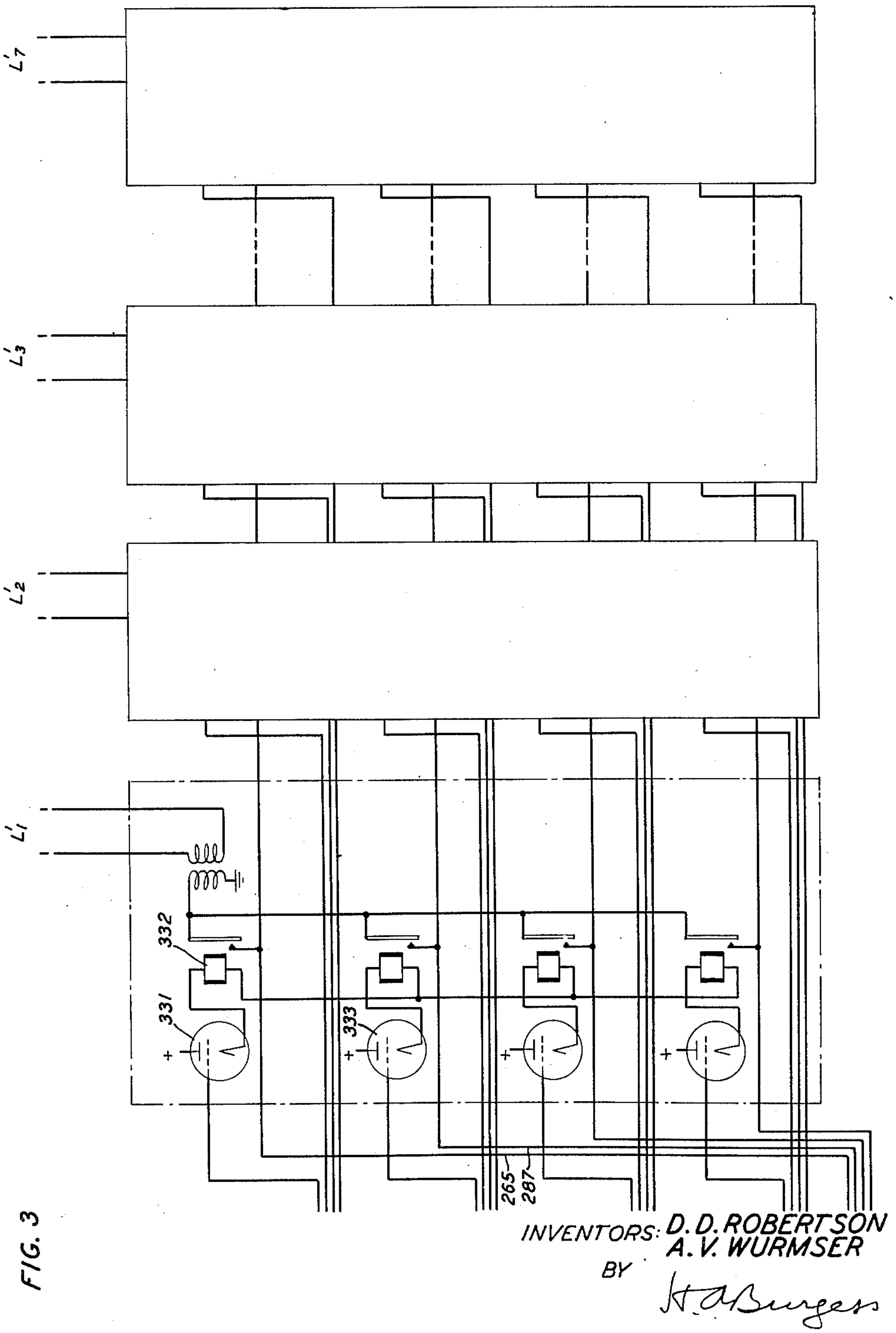

A better understanding of the invention will be had from the detailed description to follow taken in connection with the accompanying drawings in which Figs. 1, 2 and 3 when placed next to each other in that order from left to right show in schematic form as much of the over-all system as is necessary to an understanding of the present invention, Fig. 1 being a block diagram of the transmitting end and initial portion of the receiver, and Figs. 2 and 3 being schematic circuit diagrams of the receiving portion. Fig. 4 indicates the arrangement of Figs. 1 to 3 to make a complete diagram.

Referring first to Fig. 1, seven subscriber lines $L_1$ to $L_7$ are shown coming in to the speech spurt sender SS from above. This sender is assumed to contain the necessary circuits for enabling any one of the subscriber lines $L_1$ to $L_7$ to be momentarily connected to one of the four channels A, B, C or D whenever a speech spurt is present on corresponding line $L_1$ etc. The circuits for accomplishing this are shown in detail in the Dickieson et al. application above referred to, and are assumed to be present in the box SS, although they are not shown since they form no part of the present invention. A tone sender TS is also shown associated with the sender SS for transmitting identifying tones over a channel indicated on the drawing as a separate channel 10', although in practice the tones from the sender TS could be multiplexed on the same transmission line or channel as one or more of the channels A, B, C, D. As explained in the Dickieson et al. application, the tone sender TS is arranged to send one of four tones to identify the channel A, B, C or D and one or more of three tones in combinations up to seven, such combinations to identify one of the subscriber lines $L_1$ to $L_7$. This is on the assumption of course that there are a total of seven subscriber lines and four channels or trunks in accordance with the illustrative embodiments in the Dickieson et al. application. The particular tone that is sent out to identify the channel persists for the duration of the particular speech spurt. The tone or combination used to identify the subscriber is sent for a brief interval only at the beginning of the particular speech fragment and then is cut off. Circuits for accomplishing all of these effects are described fully in the Dickieson et al. application.

At the receiving terminal shown at the right of Fig. 1 a tone receiver TR is shown having two output portions; ST for subscriber tones and CT for channel tones. It will be understood that these contain suitable selectors and detectors for deriving from the tones direct currents to be impressed on the corresponding output leads. The three output leads for the subscribers' selection are indicated at 36', 37', and 38', while the four output leads for the channel selection are shown at 25' to 28'.

Three subscriber code relays are shown at 225, 226 and 227, operated respectively from the three output leads of subscriber tone selector ST. The seven relays 214 to 220 are selectively controlled from these three relays in accordance with the particular tone combination being received. The three triangular symbols associated with each relay 214 to 220 are unilaterally conducting elements preventing back-up into the energizing leads. For ease in reading the drawing, those shown as black indicate normally established circuits (all three relays 225, 226, and 227 deenergized) while those shown as white indicate normally broken circuits. Current through any one unilateral device is sufficient to energize a relay 214 etc. In order to release relay 220 it is necessary to energize all three relays 225, 226 and 227, requiring three tones. Relay 214 is released by energizing only the one relay 225. Other single tones or combinations result in release of any one chosen relay 214 etc.

The four channel tone output leads 25′ to 28′ control respective relays 237 to 240, any one of which when operated applies plate voltage to the seven gas-filled tubes such as 301, 302, etc. in the corresponding horizontal row of tubes shown in Fig. 2. There are four such rows of tubes corresponding to the four channels, each row, as already stated, comprising seven tubes. Alternatively the tubes may be spoken of as arranged in seven columns corresponding to the seven subscribers' lines. For example, the left hand column comprises the four tubes 301, 303, 305, 307; this column corresponding to the receiving subscriber line $L_1'$.

All of these tubes are normally deenergized. It will be noted that there are three controls, each of which tends to hold the tubes in a deenergized condition. Since the relays 237 to 240 are normally unoperated no plate voltage is applied to any of the tubes of Fig. 2. The inner grids of all of the tubes are held at a highly negative bias by a bias voltage connected through a resistance for each row, one of which is shown at 317. All of the relays 214 to 220 are normally energized so that 150 volts negative shown associated with the armatures of these relays is connected to the outer grids of each of these tubes. In order to energize any given tube therefore, it is necessary to remove each of these disabling causes.

When any speech spurt is received over any channel A, B, C or D, the subscriber tone pulse combination received with it over channel 10′ selects one of the seven relays 214 to 220 (Fig. 2) and releases it. Also, the channel tone received with the speech spurt operates one of the channel selecting relays 237 to 240. When one of the latter relays operates, it applies plate voltage to seven thyratrons in the corresponding row, such as 301, 302, etc., of the channel A row. This alone will not cause any thyratron to fire, however, since the shield grids of all thyratrons are normally held too far negative to fire by battery applied over vertical conductors 310, 311, etc. This negative voltage is removed from any vertical column of thyratrons by selection (release) of a subscriber tone relay 214, 215, etc. When this disabling voltage is removed and plate voltage is applied, only that thyratron at the cross-point of the marked channel and subscriber buses will respond, this being the selected thyratron. The initiation of the plate voltage produces a momentary positive pulse which nullifies the negative voltage applied to the inner grid over conductor 315 (considering channel A) from bias source 317, this pulse coming from flow of surge current through condenser 318 and through varistor 319 in its forward direction. This causes the selected thyratron to fire and drop the plate voltage on those of the same channel by current through the common resistor such as 321.

Each of the seven gas tubes in a channel row has an individual lead extending from its cathode to the control grid of a triode 331 etc. in the corresponding row of the subscriber connector (Fig. 3). The firing of one of the thyratrons puts a positive pulse on the grid of the respective triode causing relay such as 332 to energize and connect the speech lead of that channel to the corresponding subscriber line $L'_1$ to $L'_7$.

Any thyratron 301 etc. in the subscriber selector when once fired remains ionized until its plate voltage is removed, notwithstanding that relays 214 to 220 release, when selected, for only about one-hundredth second and, upon again energizing, reapply negative voltage to the shield grids of the tubes in the respective grids of the tubes in the respective column. As long as the channel tone persists, holding one of relays 237—240 operated, the one operated thyratron in the subscriber selector holds the subscriber connecting tube and relay (such as 331 and 332) actuated to maintain the connection. Upon release of the relay in the group 237—240, the circuit is restored.

Since each subscriber selecting relay 225—227 releases as soon as a connection to the desired subscriber is made, these relays become available for use by other subscribers in making calls.

What is claimed is:

1. In combination a plurality of gas-filled thermionic discharge devices arranged in a coordinate array of vertical columns and horizontal rows crossing each other in which a single one of such devices is located at each cross-point, each of said devices including an anode, a cathode and a first and second grid electrode, a lockout circuit connected to the anode electrode of each such device in a respective horizontal row, a lock-out circuit connected to the second grid electrode of each such device in a respective vertical column, means to apply anode potential to the anode electrodes of said devices row by row and means for supplying a short positive voltage pulse to the first grid electrode of each such device in a row coincident with the application of potential to the anode electrode of said device.

2. An electronic switching circuit for connecting trunks to lines comprising gas-filled tubes arranged in rows according to trunks and in columns according to lines, all of said tubes normally disabled, means operative in initiation of a connection to apply an enabling voltage to an electrode of all tubes in a column corresponding to the selected line, and to apply an enabling voltage to another electrode of all tubes in a row corresponding to the trunk to be connected, means operative in response to the application of the latter voltage to produce a transient voltage on a further electrode of all tubes in the same row, all three voltages being necessary to permit operation of a tube, whereby one only of said tubes operates, means to withdraw the first mentioned voltage after the tube operates and to hold the tube operated by the second mentioned voltage, and means controlled by the operated tube to effect connection between the corresponding trunk and line.

3. In a switching circuit, groups of discharge devices each device when energized controlling a switching point, each device being common to two groups, means to apply an enabling voltage to the tubes of one group including a given tube, means to apply an enabling voltage at the same time to tubes of the other group including the given tube, and means controlled by application of one of said enabling voltages to apply a transient voltage to the corresponding group including said given tube, all three voltages being necessary to permit operation of a tube, and said tube alone responding to said three voltages.

4. In a coordinate switching circuit, a double grid gas-filled tube at each cross-point of said circuit, means for applying anode voltage to all of the tubes in a row to promote operation of said circuit, means for applying positive change of bias to one grid of all tubes in a column to further promote operation of said circuit, means incidental to application of said first voltage to produce a positive transient voltage swing on the other grid of each tube in a row, one only of said tubes on which all three of said voltages conjointly occur becoming ionized, and means to continue application of only said anode voltage to maintain said tube in its ionized condition.

5. In a speech-spurt system, trunk circuits incoming to a receiving station, subscribers' lines to be connected to said trunk circuits to receive speech spurts therefrom, said trunk circuits each having a cross-over point with respect to each of said subscribers' lines and means at each cross-over point for effecting connection between the respective trunk circuit and subscriber line, means to condition one only of said subscriber lines for connection at all of its cross-over points for an initial period of a small fractional part of the duration of a speech spurt, except at cross-over points of said line with trunk circuits at the moment in use, means operative during said initial period for applying actuating power for effecting connection at all cross-over points of one of said trunk circuits with said lines, whereby connection is effected to only the conditioned line, means to maintain said connection for the duration of a speech spurt and means operated in response to the effecting of said connection for reducing the actuating power below the operative level required to effect connection at all of the other cross-over points of said trunk circuit with said lines.

DONALD D. ROBERTSON.
ALPHONS V. WURMSER.

REFERENCES CITED

The following references are of record in the file of this patent:

UNITED STATES PATENTS

| Number | Name | Date |
|---|---|---|
| 2,291,752 | Parker | Aug. 4, 1942 |
| 2,542,672 | Hecht | Feb. 20, 1951 |